(12) United States Patent
Schwerdt et al.

(10) Patent No.: US 8,062,525 B2
(45) Date of Patent: Nov. 22, 2011

(54) PROCESS FOR TREATING WATER IN A TREATMENT PLANT

(75) Inventors: Jörg Schwerdt, Kaarst (DE); Stefan Wolff, Kaarst (DE); Jan Parmentier, Hemiksem (BE)

(73) Assignee: L'Air Liquide Societe Anonyme Pour l'Etude Et l'Exploitation des Procedes Georges Claude, Paris (FR)

( * ) Notice: Subject to any disclaimer, the term of this patent is extended or adjusted under 35 U.S.C. 154(b) by 144 days.

(21) Appl. No.: 12/333,945

(22) Filed: Dec. 12, 2008

(65) Prior Publication Data

US 2009/0301965 A1 Dec. 10, 2009

(30) Foreign Application Priority Data

Dec. 14, 2007 (DE) .......................... 10 2007 060 914

(51) Int. Cl.
*C02F 3/00* (2006.01)

(52) U.S. Cl. ....................................... 210/627

(58) Field of Classification Search .................... 210/627
See application file for complete search history.

(56) References Cited

U.S. PATENT DOCUMENTS

| | | | |
|---|---|---|---|
| 6,126,842 A | 10/2000 | Decker | |
| 6,780,319 B1 * | 8/2004 | Thieblin et al. | 210/627 |
| 7,309,432 B1 | 12/2007 | Fabiyi et al. | |
| RE40,565 E * | 11/2008 | Thieblin et al. | 210/627 |
| 7,513,999 B2 | 4/2009 | Fabiyi et al. | |
| 7,695,622 B2 | 4/2010 | Fabiyi et al. | |
| 2006/0008661 A1 | 1/2006 | Wijesundara et al. | |

FOREIGN PATENT DOCUMENTS

| | | |
|---|---|---|
| DE | 19920269 | 3/2001 |
| DE | 10215413 | 10/2003 |

OTHER PUBLICATIONS

Chu, L.-B. et al., "Enhanced sludge solubilization by microbubble ozonation," Chemosphere 72 (2008), pp. 205-212.

Chu, L. et al., "Progress and perspectives of sludge ozonation as a powerful pretreatment method for minimization of excess sludge production," Water Research 43 (2009), pp. 1811-1822.

Dytczak, M.A. et al., "Ozonation reduces sludge production and improves denitrification," Water Research 41 (2007), pp. 543-550.

Mahmood, T. et al., "A review of secondary sludge reduction technologies for the pulp and paper industry," Water Research 40 (2006), pp. 2093-2112.

(Continued)

*Primary Examiner* — Chester Barry
(74) *Attorney, Agent, or Firm* — Allen E. White

(57) ABSTRACT

The process according to the invention for treating water in a treatment plant comprising a reaction chamber in which a biodegradable material present in the water is biodegraded at least partly by microorganisms, in the course of which, at least temporarily, water is transferred out of the reaction chamber into a separating chamber and the biodegradable material and the microorganisms are separated at least partly from the water therein, a return stream comprising biodegradable material and at least some of the microorganisms flowing out of the separating chamber into the reaction chamber via a recycle line, is characterized in that at least some of the following substances: a) the biodegradable material and b) the microorganisms are treated with ozone ($O_3$), an amount of 15 to 150 milligrams of ozone per kilogram of dry substance of the biodegradable material and of the microorganisms being added per hour in the reaction chamber.

13 Claims, 1 Drawing Sheet

OTHER PUBLICATIONS

Manterola, G. et al., "The effect of operational parameters of the process of sludge ozonation on the solubilisation of organic and nitrogenous compounds," Water Research 42 (2008), pp. 3191-3197.

"Using ozone to reduce sludge," European Environmental Press (EEP), Mar. 29, 2005, accessed online Jun. 23, 2011.

* cited by examiner

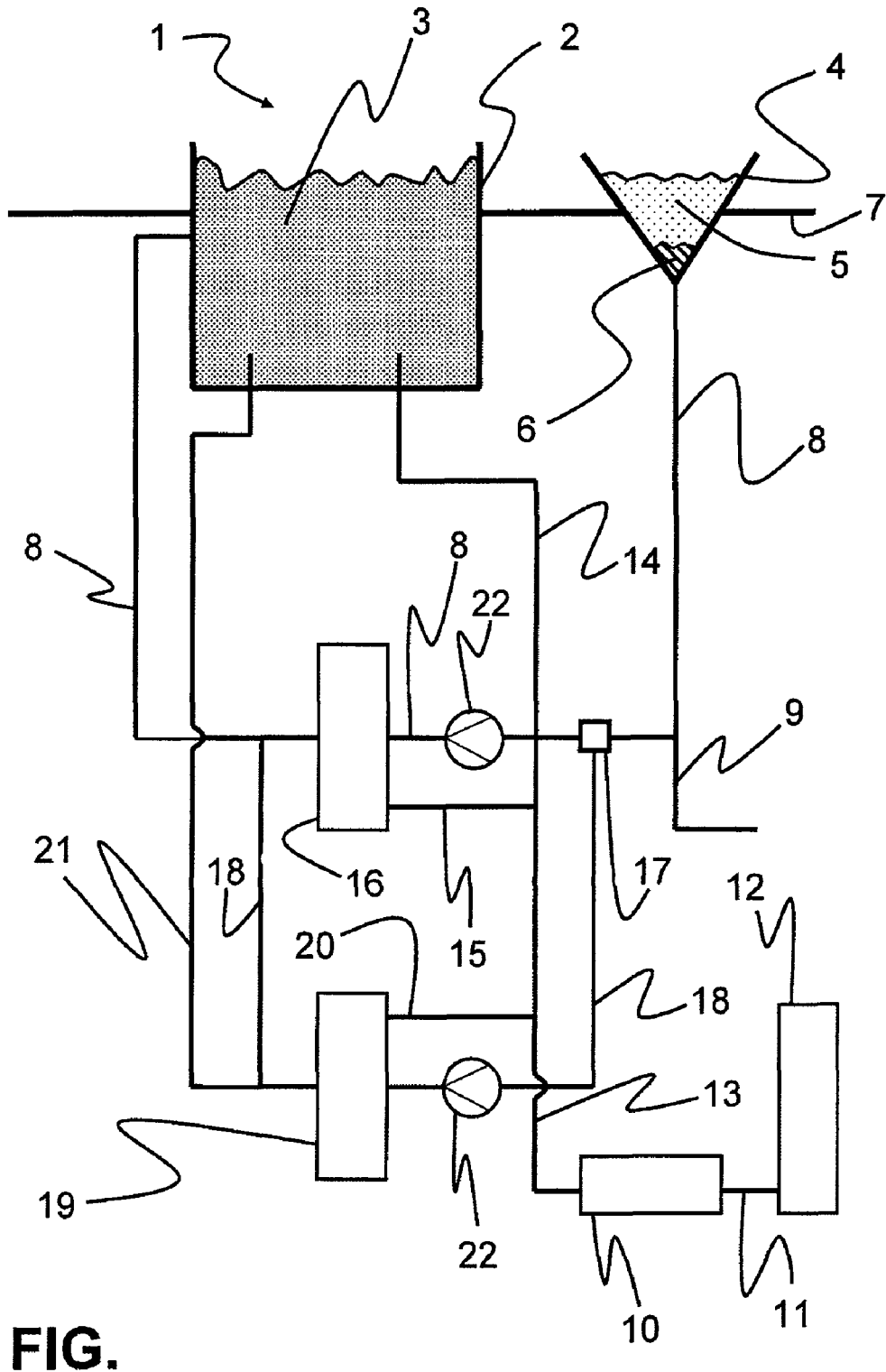
FIG.

ns (SVI) is reduced significantly. The term "sludge volume index" is more particularly understood to mean a measure of the sedimentation capacity (settling) of the activated sludge,

PROCESS FOR TREATING WATER IN A TREATMENT PLANT

CROSS-REFERENCE TO RELATED APPLICATIONS

This application claims the benefit of priority under 35 U.S.C. §119 (a) and (b) to German Application No. 10 2007 060 914.2, filed Dec. 14, 2007, the entire contents of which are incorporated herein by reference.

BACKGROUND

The present invention provides a process for treating water in a treatment plant and a corresponding treatment plant. In particular, the invention has for its subject-matter the reduction and treatment of the sludge in the biological wastewater treatment.

Water is treated in many different ways. In particular, industrial and domestic wastewater is, as appropriate, processed in several stages. One of these treatment stages, especially in the treatment of wastewater, is often a biological treatment stage. In this case, biodegradable material is treated in water by adding to it microorganisms which convert the biodegradable material. This forms sludge which has to be removed from the corresponding reaction chambers in order to ensure the capacity of the tank and the survival of the microorganisms. To this end, separating chambers—so-called secondary clarifiers—are used. As a result of sedimentation in this secondary space, the sludge which comprises the biodegradable materials and the microorganisms is removed and disposed of. Often, a portion of the sludge from the separating chamber is recycled back into the reaction chamber of the biological wastewater treatment in order to maintain a constant activity or amount of microorganisms here. The separated water from the separating chamber can be sent to further treatment steps or, if appropriate, even to the environment.

In order to reduce this sludge, which gives rise to not inconsiderable costs in its disposal, various approaches are already known. For instance, DE 102 15 413 A1 and US 2006/008,661 A1 disclose processes in which ozone is added in a relatively large amount. A similar process is known from DE 199 20 269 A1.

In addition, it has been found that specific types of biodegradable material, for example particular bacteria, are biodegradable only with difficulty by the microorganisms currently used. This leads to unsatisfactory degradation results and relatively high pollution of biological origin in the wastewater on completion of the treatment.

Proceeding from this, it is an object of the present invention to at least alleviate the disadvantages known from the prior art. More particularly, a process and an apparatus should be specified, with which an improved workup result, especially with regard to bacteria which are otherwise difficult to biodegrade, can be achieved.

These objects are achieved by a process for treating water and a corresponding treatment plant having the features of the independent claims. The particular dependent claims are directed to advantageous developments.

SUMMARY OF THE INVENTION

The process according to the invention for treating water in a treatment plant comprising a reaction chamber in which a biodegradable material present in the water is biodegraded at least partly by microorganisms, in the course of which, at least temporarily, water is transferred out of the reaction chamber into a separating chamber and the biodegradable material and the microorganisms are separated at least partly from the water therein, a return stream comprising biodegradable material and at least some of the microorganisms flowing out of the separating chamber into the reaction chamber via a recycle line, is characterized in that at least some of the following substances: a) the biodegradable material and b) the microorganisms are treated with ozone ($O_3$), an amount of 15 to 150 milligrams of ozone per kg of dry substance of the biodegradable material and of the microorganisms being added per hour in the reaction chamber.

This does not mean that ozone need necessarily be metered in within the reaction chamber; instead, the amount to be added is based on the amount of dry substance of the biodegradable material in the reaction chamber. As a result of the supply of this amount of ozone per kg of dry substance of the biodegradable material in the reaction chamber, in particular, damage to so-called filamentous bacteria, for example Microthrix Parvicella, Nocardioforme actinomiceten and Thiothrix-021N is achieved, which leads to a significant reduction in the filamentous content. The term "filamentous content" is understood more particularly to mean a measure of the amount and length of the filamentous bacteria per unit volume. For this purpose, a visual study is effected, with the aid of which the filamentous content is determined between 0 (no filamentous bacteria) to 6 (excessive filamentous bacteria). In addition, the metered addition of the ozone in the inventive amount achieves the effect that the sludge volume index (SVI) is reduced significantly. The term "sludge volume index" is more particularly understood to mean a measure of the sedimentation capacity (settling) of the activated sludge, i.e. of the biodegradable material and of the microorganisms. The SVI states what volume 1 gram of activated sludge (based on dry mass) occupies after a sedimentation time of 30 minutes per litre of sludge.

In particular, the SVI is calculated by dividing the sludge volume by the sludge dry substance. The sludge dry substance is the mass of the sludge per unit volume of the contents of the reaction chamber. The occurrence of sludge can also be reduced in an advantageous manner. All of this increases the efficiency of biological purification of the water, and correspondingly persistent bacteria can also be degraded by the ozone owing to damage to the cell membrane.

The very low dose of 15 to 150 mg of ozone per kilogram of dry mass of the biodegradable material and of the microorganisms in the reaction chamber per hour has surprisingly been found to be sufficient to reduce the filamentous content and the sludge volume index. In particular, a reduction of the sludge volume index by at least 20%, especially of at least 40% or even at least 60% can be achieved. Alternatively to this dose, a dose of 6 g to 12 g of ozone per kilogram of dry mass of the biodegradable material and of the microorganisms in the return stream has also been found to be advantageous. This dose too can be used advantageously with the processes and apparatus features described below irrespective of the low dose stated above. Preference is further given to doses of 15 to 100 mg of ozone per kilogram of dry mass of the biodegradable material and of the microorganisms in the reaction chamber per hour, particular preference to corresponding doses of 30 to 80 mg of ozone.

In an advantageous embodiment of the process according to the invention, an amount of 0.5 to 4 g of ozone per kg of amount treated of the dry substance of the substances in the return stream, preferably 1 to 4 g of ozone, more preferably 1 to 3 g of ozone, in each case per kg of amount treated of the dry substance of the substances in the return stream, is added to at least part of the return stream.

The ozonation of the return stream is possible in a simple manner; in this treatment, the effectiveness of the reactions of the ozone with the appropriate microorganisms and/or the biodegradable material is relatively high, since undesired reactants for the ozone are present in a smaller amount than in the reaction chamber.

In a further advantageous embodiment of the process according to the invention, 1% by volume to 20% by volume of the return stream is treated with ozone.

This can be achieved especially by treating only a portion of the return stream, i.e., more particularly, a portion of the return stream is branched off before it flows into the reaction chamber and treated and only then is sent to the reaction chamber, or else by an intermittent treatment of the return stream. These proportions of the return stream have been found to be advantageous since the desired improvement in the degradation of the bacteria which are otherwise difficult to biodegrade can thus be achieved.

In a further advantageous embodiment of the process according to the invention, the ozone is introduced at least one of the following points:
a) into the recycle line;
b) into the reaction chamber; and
c) into a vessel which is connectable to the recycle line such that at least some of the substances in the recycle line can be introduced into the vessel.

Option a) is understood to mean especially the direct introduction into the entire return stream of the recycle line. This can preferably be effected intermittently, i.e. only at certain times for particular periods. Direct introduction into the reaction chamber according to option b) has the advantage that it is simple to realize in apparatus and process technology terms. Option c) is understood to mean two variants. Firstly, such a vessel can be provided directly in the recycle line; secondly, the recycle line can comprise a branch by means of which a portion of the recycle stream can be branched off from the recycle line, treated and then introduced into the reaction chamber and/or the recycle line. In particular, at least two of the options a) to c) designated above can be combined; preferably, it is also possible to combine the two variants of option c) with one another or with option a) and/or b).

In a further advantageous embodiment of the process according to the invention, the ozone is introduced into the vessel, in which case the treatment time is in the range of 0.5 to 20 minutes, preferably in the range of 0.5 to 9 minutes.

It has been found that, surprisingly, even such a short treatment time with ozone results in significant damage to the corresponding bacteria and hence to a significant increase in the biodegradability of these bacteria.

In a further advantageous embodiment of the process according to the invention, ozone is introduced discontinuously.

This means especially that ozone is supplied only at certain times and for particular periods, while there is merely respiration of the appropriate microorganisms by means of molecular oxygen ($O_2$) within or at other times. Discontinuous supply of ozone allows the amount of ozone added to be controlled in an advantageous manner, such that precise metered addition of the ozone can be effected.

In a further aspect of the present invention, a treatment plant for treating water is proposed, comprising a reaction chamber in which a biodegradable material present in the water is at least partly biodegradable by microorganisms, and a separating chamber into which water can be transferred out of the reaction chamber and in which the biodegradable material and the microorganisms can be separated at least partly from the water, reaction chamber and separating chamber being connectable via a recycle line for at least partial recycling of the biodegradable material removed and/or of the microorganisms removed, wherein at least one vessel for at least temporary treatment of at least one of the following substances:
a) of the biodegradable material and
b) of the microorganisms
with ozone ($O_3$) is provided at least one of the following points:
A) in the recycle line;
B) in a feed line connecting the recycle line to the reaction chamber; and
C) in a bypass line connecting the recycle line to the recycle line.

Option A) is realizable either by treating the return stream flowing within the recycle line in its entirety during the flow, or else by providing an appropriate vessel in the recycle line. In operation, the vessel is at least partly filled with the return stream which is then treated in the vessel, after which it can flow further through the recycle line. Option B) enables an embodiment in which a portion of the return stream, preferably a predeterminable or controllable portion of the return stream, can be removed from the recycle line, then treated in a correspondingly provided vessel and then fed back to the reaction chamber via the feed line. Option C) likewise enables the treatment of at least a portion of the return stream, by removing it from the recycle line, treating it and then feeding it back to the recycle line. For this purpose, a corresponding vessel is provided in the bypass line. Options A), B) and C) can be combined with one another as desired; preference is also given to an embodiment in which two of these options are combined with one another.

In an advantageous embodiment, the treatment plant is suitable and intended for performing the process according to the invention.

The inventive treatment plant and the process according to the invention for treating water advantageously allow the degradation of biological material and especially also, in a selective manner, of filamentous bacteria, which can be converted only inadequately with processes known from the prior art. The inventive treatment plant allows exact control of what amounts of biologically active or biodegradable material are treated with ozone, since the treatment of part-streams of the return stream, in a positive manner, makes it possible to exactly determine what amount of biodegradable material is treated with what amount of ozone.

All of the details and advantages disclosed for the inventive treatment plant can be transferred and applied directly to the process according to the invention, and vice versa. The invention is illustrated in detail hereinafter with reference to the sole appended drawing, without being restricted to the embodiment shown there.

BRIEF DESCRIPTION OF THE FIGURES

The FIGURE shows a schematic of a working example of an inventive treatment plant.

DETAILED DESCRIPTION OF THE INVENTION

The treatment plant 1 comprises a reaction chamber 2 in which biodegradable material present in the water 3 contained in the reaction chamber is at least partly biodegraded by microorganisms. At least temporarily, water 3 is transferred out of the reaction chamber 2 into a separating chamber 4. The biodegradable material and the microorganisms are separated at least partly from the water 3 therein, for example by means of sedimentation. In order to prevent sedimentation in the reaction chamber 2, it is preferably agitated, for example by providing appropriate stirrers and/or blowing in gases. The gases which are typically blown in include especially molecular oxygen ($O_2$). The apparatus needed for this purpose is not shown here for the sake of clarity.

In the separating chamber 4, the water 3 is thus separated into a water phase 5 and a sludge phase 6 which consists essentially of biodegradable material and microorganisms. The water phase 5 is removed from the separating chamber 4 via a water outlet. The sludge phase 6 is removed from the separating chamber 4 via a recycle line 8. The recycle line 8 can be used to introduce at least part of the sludge phase back into the reaction chamber 2. At least part of the sludge phase 6 can also be removed via a sludge outlet 9 and be disposed of or sent to further processing.

According to the invention, 15 to 150 mg of ozone per kg per hour are added per kg of dry substance of the biodegradable material in the reaction chamber 2. To this end, ozone is generated in an ozone generator 10, which is supplied with molecular oxygen ($O_2$) via an oxygen inlet 11 from an oxygen reservoir 12. In the ozone generator, in a known manner, ozone is generated at least partly from the molecular oxygen, for example by a light arc or the like. A mixture of molecular oxygen ($O_2$) and ozone ($O_3$) leaves the ozone generator 10 via the oxidant inlet 13. In particular, a proportion by volume of ozone of 0% to 14% is achieved in this case.

This gas mixture can then be introduced directly into the reaction chamber 2 via a first inlet 14. Alternatively or additionally, the gas mixture of oxygen and ozone can be introduced into a first vessel 16 via a second feed 15. This first vessel 16 is provided in the recycle line 8, and can be filled via this line with at least a portion of the sludge phase 6, i.e. with the substances in the return stream. These substances include biodegradable material and/or microorganisms which can be treated with ozone in the first vessel 16. From the recycle line 8, a bypass line 18 branches off in a valve 17. In the bypass line 18, a second vessel 19 is provided, which can be supplied via a third inlet 20 with oxygen and/or ozone from the ozone generator 10 via the oxidant inlet 13. By means of the valve 17, a portion of the return stream in the recycle line 8 can be directed into the bypass line 18 and can be treated there in the vessel 19 in accordance with the present invention. For instance, it is possible to regulate what amount of biodegradable material or of microorganisms is treated. It is thus possible to control the biology in the reaction chamber 2 in order thus to obtain very substantially optimal degradation of the biodegradable materials in the water 3. Alternatively or additionally, the material treated in the second vessel 19 can be conducted directly into the reaction chamber 2 via a feed line 21. In principle, the different junctions of recycle line 8, sludge outlet 9, bypass line 18 and/or feed line 21 can be provided with appropriate, especially activable, valves, which enables regulation of the individual streams through these lines 8, 9, 18, 21. In addition, recycle line 8 and bypass line 18 have pumps 22, by means of which conveying of the streams through these lines 8, 18 is possible, and by means of which the flow rate in these lines 8, 18 can be regulated.

The inventive treatment plant 1 and the process according to the invention for treating water 3 advantageously allow the degradation of biological material and especially also, in a selective manner, of filamentous bacteria, which can be converted only inadequately with processes known from the prior art. The process according to the invention enables this good conversion with a low use of ozone and is thus inexpensive.

The inventive treatment plant 1 allows exact control of what amounts of biologically active or biodegradable material are treated with ozone, since the treatment of part-streams of the return stream, in a positive manner, makes it possible to exactly determine what amount of biodegradable material is treated with what amount of ozone.

REFERENCE NUMERAL LIST

1 Treatment plant
2 Reaction chamber
3 Water
4 Separating chamber
5 Water phase
6 Sludge phase
7 Water outlet
8 Recycle line
9 Sludge outlet
10 Ozone generator
11 Oxygen inlet
12 Oxygen reservoir
13 Oxidant inlet
14 first inlet
15 second inlet
16 first vessel
17 Valve
18 Bypass line
19 second vessel
20 third inlet
21 Feed line
22 Pump It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for treating water in a treatment plant comprising a reaction chamber in which a biodegradable material present in the water is biodegraded at least partly by microorganisms, in the course of which, at least temporarily, water is transferred out of the reaction chamber into a separating chamber and the biodegradable material and the microorganisms are separated at least partly from the water therein, a return stream comprising biodegradable material and at least some of the microorganisms flowing out of the separating chamber into the reaction chamber via a recycle line, characterized in that at least some of the following substances: a) the biodegradable material and b) the microorganisms are treated with ozone ($O_3$), an amount of 15 to 150 milligrams of ozone per kilogram of dry substance of the biodegradable material and of the microorganisms being added per hour in the reaction chamber.

2. The process of claim 1, wherein an amount of 0.5 to 4 grams of ozone per kilogram of amount treated of dry substance of the substances in the return stream is added to at least part of the return stream.

3. The process of claim 1, wherein 1% by volume to 20% by volume of the return stream is treated with ozone.

4. The process of claim 1, wherein the ozone is introduced at at least one of the following points:
   a) into the recycle line;
   b) into the reaction chamber; and c) into a vessel which is connectable to the recycle line such that at least some of the substances in the recycle line can be introduced into the vessel.

5. The process of claim 4, wherein the ozone is introduced into the vessel, the treatment time being in the range of 0.5 to 20 minutes.

6. The process of claim 1, wherein ozone is introduced discontinuously.

7. The process of claim 1, wherein the ozone is introduced at least one of the following points:
a) into the reaction chamber; and
b) into a vessel which is connectable to the recycle line such that at least some of the substances in the recycle line can be introduced into the vessel.

8. The process of claim 7, wherein an amount of 0.5 to 4 grams of ozone per kilogram of amount treated of dry substance of the substances in the return stream is added to at least part of the return stream.

9. The process of claim 7, wherein 1% by volume to 20% by volume of the return stream is treated with ozone.

10. The process of claim 9, wherein the ozone is introduced into the vessel, the treatment time being in the range of 0.5 to 20 minutes.

11. The process of claim 7, wherein the ozone is introduced at least one of the following points:
a) into the reaction chamber; and
b) into a vessel which is connectable to the recycle line such that at least some of the substances in the recycle line can be introduced into the vessel.

12. The process of claim 7, wherein ozone is introduced discontinuously.

13. A process for treating water in a treatment plant comprising a reaction chamber in which a biodegradable material present in the water is biodegraded at least partly by microorganisms, in the course of which, at least temporarily, water is transferred out of the reaction chamber into a separating chamber and the biodegradable material and the microorganisms are separated at least partly from the water therein, a return stream comprising biodegradable material and at least some of the microorganisms flowing out of the separating chamber into the reaction chamber via a recycle line, characterized in that at least some of the following substances: a) the biodegradable material and b) the microorganisms are treated with ozone ($O_3$), an amount of 15 to 100 milligrams of ozone per kilogram of dry substance of the biodegradable material and of the microorganisms being added per hour in the reaction chamber.

* * * * *